United States Patent Office 3,809,575
Patented May 7, 1974

3,809,575
METHOD AND APPARATUS FOR REMOVAL OF SURFACE MOISTURE FROM PELLETS
Denis Yeo, Columbia, S.C., assignor to Westinghouse Electric Corporation, Pittsburgh, Pa.
Filed Mar. 1, 1972, Ser. No. 230,899
Int. Cl. B08b 5/04
U.S. Cl. 134—21
9 Claims

ABSTRACT OF THE DISCLOSURE

Apparatus for rapidly, efficiently and effectively removing surface fluids from a wetted cylindrical body and in particular nuclear fuel pellets, comprising an elongated trough member in which the cylindrical body moves on its side along the trough with its cylindrical sides in contact with the sides of the trough and in such movement passes adjacent to one or more apertures or slots through which air is drawn at a high velocity so that the fluid along with any dust or particles on the surface of the body is picked up and carried away through the aperture to an evacuating apparatus. The cylindrical body is rotated as it passes adjacent the aperture so that all surfaces of the body are exposed to the high velocity air stream being drawn in through the apertures whereby substantially all the water and surface dusts and loose particles are removed. A process for removing excess surface fluids from a wetted cylinder is also set forth.

BACKGROUND OF THE INVENTION

Field of the invention

This invention relates to a process for mechanically removing excess moisture from cylindrical bodies and particularly water and other liquids from nuclear fuel pellets such as sintered uranium oxide pellets.

Description of the prior art

Nuclear fuel pellets after being compacted and sintered at an elevated temperature have a somewhat rough and irregular surface condition so that they are not of the uniform size and precise dimensions required for insertion in and loading of a fuel rod assembly. Consequently, the fuel pellets are ground to a uniform diameter in a centerless wet grinding operation. As a result, the exterior surfaces are wet and are covered by undesirable water along with grinding dust particles comprising radioactive material suspended in the water on the surface of the pellets.

In order to clean the pellets and to remove the water, a number of different procedures have been employed. In some cases the pellets have been passed through an oven where they are heated over a period of time in order to evaporate all the water and other liquid. However, some of the uranium oxide grinding residue remains on the pellets. The uranium oxide powder, usually enriched, is not only an expensive material but it can contaminate surrounding areas. Trays and other receptacles with which the pellets come in contact either wet or after drying are contaminated and become quite dirty. It will be understood that such "dirt" includes not only the physical presence of undesirable grinding residue dust but also nuclear or radioactive material which is an undesirable contaminant. Physical wiping of the pellets with a cloth or the like is not only costly and time consuming but is not very economical and is not necessarily thorough. Various other techniques for removing the excess moisture from the pellets have been attempted with less than satisfactory results.

It is desirable to not only remove the moisture which can result in reduced fuel rod life in service, but to recover substantially all of the grinding dust produced during the operation of grinding the nuclear fuel elements both as an economy measure and a housecleaning and ecology expedient.

It should be understood that the sintered pellets are substantially impermeable to moisture and consequently water or other grinding liquid is present only on the surface of the pellets.

SUMMARY OF THE INVENTION

It has been found in accordance with this invention that cylindrical bodies, and particularly nuclear fuel pellets, may be rapidly and completely treated to remove not only surface moisture but also any grinding residues comprising the radioactive material, by a simple process wherein the wet cylindrical pellets move on their sides along an elongated trough member and pass near one or more apertures in the walls of the trough member located at a point adjacent the sides of the cylindrical pellet. Air is drawn in at a high velocity through the apertures and past the sides and ends of the pellets so that as the pellets pass by the apertures any excess surface moisture is entrained and picked up in the high velocity air stream along with any grinding residues, particles and dust. The pellet is rotated while passing the aperture so that all of the surfaces are subjected to the high velocity air stream and consequently the entire pellet surface is completely dried and cleaned of substantially all of the fluid thereon.

DETAILED DESCRIPTION OF THE PREFERRED EMBODIMENTS OF THE INVENTION

Figure 1:
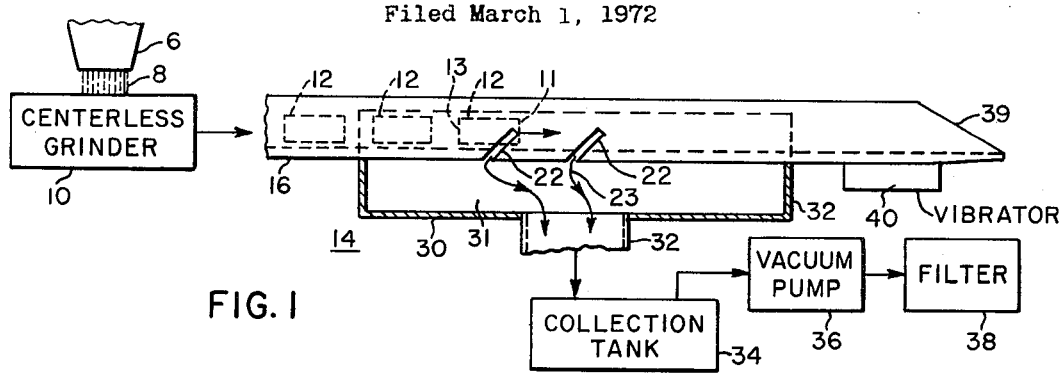
FIG. 1 is a schematic view partly in section of apparatus for practicing the process.

In accordance with the present invention, which will be described with respect to nuclear fuel pellets but may be applied to other cylindrical bodies, nuclear fuel pellets, for example uranium dioxide pellets comprising for instance 3% enriched uranium, after having been compacted at a high pressure and then sintered at a temperature of the order of 1800° C., require wet grinding to a precise dimension of, for example 0.50 inch in diameter with a length of the order of one inch. The grinding and processing of the cylindrical pellet is shown in FIG. 1 wherein the sintered pellets 12 are initially ground in a centerless grinder 10 to the required diametral dimensions. In this process, a grinding liquid 8 is applied from a spout 6 on the pellets as they are being ground. The liquid 8 ordinarily will be water. After this operation, the pellets 12 are coated with a layer of water which carries some quantity of the grinding residue which includes enriched uranium particles. The wet pellets 12 are immediately passed through the apparatus 14 for removing substantially all of the surface moisture and any dust or residue on the surface thereof.

The apparatus 14 comprises a trough-like member 16 which in its simplest form may comprise a channel member arranged so that the apex 21 is located downwardly.

The sides of the trough will ordinarily be symmetrically flared out with respect to the vertical plane passing through the apex 21. In the preferred embodiment of the invention, the sides are at an angle of 90° with respect to the apex 21. However, this angle is not critical and may be varied substantially, for instance, from 60° to 120°. In some cases, the trough-like member may have a rounded bottom corner approaching or conforming to the radius of the cylindrical body or pellet 12.

Figure 2:
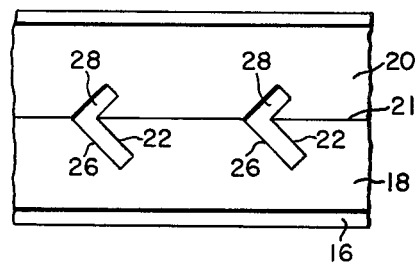
FIG. 2 is a fragmentary top view of the channel member in FIG. 1.
Figure 3:
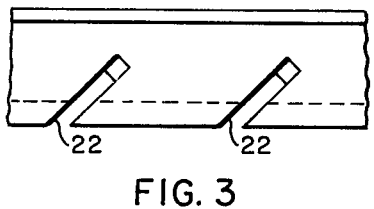
FIG. 3 is a side view of a portion of the channel member of FIG. 1.

As shown in FIGS. 1, 2 and 3, the trough-like member 16 comprises sides 18 and 20 in which are provided apertures in the form of slots 22. While the slots may be symmetrical with respect to the axis 21 of the trough member, it is preferable to provide slots 22 that are asymmetrical, namely with one leg 26 longer than the other leg 28 for reasons to be set forth later.

Surrounding the slotted area of member 16 is an enclosure 30 forming a plenum chamber 31 to which is connected a duct 32 connected to a collection tank 34 which, in turn, is connected to a vacuum pump 36 whose exhaust is an absolute filter 38 for radioactive pellets. When the vacuum pump is energized, it will draw in air from the collection tank and thence via conduit 32 from the plenum chamber 31, so that air is drawn in from the slots 22 at a high velocity in the pellet's passage past the slots. Air is drawn into each slot 22 from about the pellet as well as along the lower pellet surface below the pellet and above apex 21.

A vibrator 40 is attached to the trough 16 and when energized it will cause the pellets 12 in the trough to slowly move from left to right as viewed in FIG. 1.

As each pellet 12 reaches the first slot 22, the high velocity air draws off moisture from the end face 11 thereof and then the high velocity air streams 23 pass over the cylindrical surface of each pellet 12, and finally removes moisture from end face 13. Since leg 26 of each pellet is longer than the leg 28, more air is drawn in through leg 26, as a result asymmetrical air flow streams affect the pellet 12, and consequently this difference in the air stream forces will begin to rotate each pellet 22 as it reaches slot 28. By correlating the speed of the vibrator to the speed of the rotation of the pellets 12, each pellet may rotate completely one or more times from the time the front face 11 reaches the slot until the rear face 13 passes beyond the slot. The drawing in of the air also holds the pellet closely against the sides of the trough channel 16 and this assists in assuring substantially complete removal of all moisture, dust and grinding residue from the surface of the pellet. In order to assure the maximum drying, a plurality of aperture air slots may be provided in the channel each of which is effective in exposing the surface of the pellet to the high velocity air streams.

The high velocity air streams 23 are drawn into the collection tank 34 which ordinarily will be a large chamber provided with suitable means for slowing down the air and causing most of the solid particles of dust and residue as well as any drops of water to drop and remain within the collection tank. Cyclone or other means may be employed within the tank to assist in the separation of any liquid or solid entrained in the air stream 23. The essentially clean air is then drawn away by vacuum pump 36 and discharged through the filter 38.

Clean and dry pellets then reach the end 39 of the conveyor where they may be collected and stored in appropriate trays for inspection and use.

Figure 5:
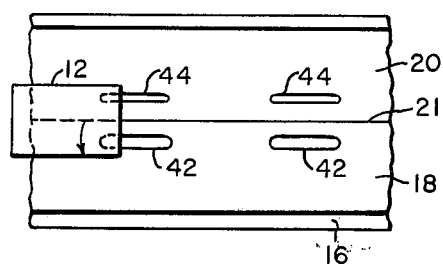
FIG. 5 is a top view of the channel member of FIG. 4.
Figure 4:
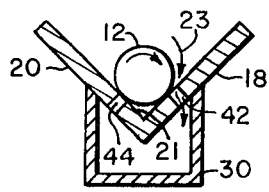
FIG. 4 is a vertical cross section through a channel member having a different aperture system than in FIGS. 1, 2 and 3.

An alternate modification of the trough-like member 18 with respect to the air apertures is shown in FIGS. 4 and 5. In this modification, elongated slots 42 and 44 positioned at about the line of contact between the pellet 12 and the sides 18 and 20 are provided. The slot 42 is substantially wider than slot 44 so that more air is drawn in by slot 42 than by slot 44. When a pellet approaches the slot portion slots 42 and 44, the difference in air volume pulled in slot 42 along the upper pellet surface as compared to that to slot 44 causes the pellet 12 to rotate clockwise as viewed in FIG. 4.

Figure 6:
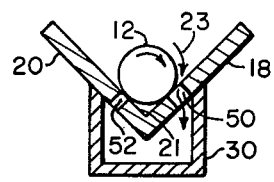
FIG. 6 is a vertical cross section of another modification of a channel member.

Another modification of slotted aperture is shown in FIG. 6 wherein slot 50 is so located and so dimensioned that when the pellet 12 reaches slot 50 there is a larger opening above the point where the sides of the pellet 12 and side 18 meet as compared to slot 52 so that more air is drawn through slot 50 than is drawn in through slot 52. The slot 52 in a sense is masked or convered by the sides of the pellet 52 so that a much smaller volume of air can enter through this slot. The difference in the volume of air passing through slot 50 as compared to slot 52 causes the pellet 12 to rotate clockwise as viewed in FIG. 6.

Figure 7:
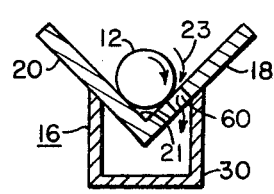
FIG. 7 is a vertical cross section of a still different modification of a channel member.

Referring to FIG. 7, there is shown a still further configuration of aperture in the trough member 16 wherein only a single slot 60 is so disposed that more air can enter at the upper part of the channel 18 with respect to the side of the pellet 12 than from below and the difference in the amount of air admitted from up above as compared from below the pellet 12 similarly causes the clockwise rotation of the pellet 12 as it passes down the slot.

It will be understood that numerous other configurations and modifications of apertures in the apparatus with respect to the cylindrical pellet will be evident to one skilled in the art whereby the air being drawn in past the pellet functions not only to entrain any surface moisture but also to rotate the pellet so as to expose all surfaces of the pellet to high velocity air streams as it travels along the trough member. While only two sets of slots are shown in some of the modifications, more can be provided if desired. If two sets of apertures are employed, one in each channel side, the pellet 12 need rotate less than a full turn before all its sides have been exposed to the high velocity air stream.

Ordinary atmospheric air at ambient temperature will be ordinarily used. However, heated air may be applied to the final aperture, when two or more are present, in order to effect maximum drying.

While vibratory means are shown for moving the pellets along the trough member 16, a suitable speed being from $\frac{1}{10}$ inch to 5 inches per second, it will be understood that the pellets may be moved mechanically by a suitable pushing mechanism or the trough member may be slanted so that gravity plus vibrations will cause the pellets to travel down the trough.

The movement of the pellets may be intermittent, as for instance when a 60 hertz vibrator is attached to the trough member 16, or it may be steady.

Successive pellets with a slight separation of say $\frac{1}{8}$ inch between the pellets may be processed to complete dryness.

Apparatus was built corresponding to the showing in FIG. 7 of the drawing and was found to be effective in substantially completely removing water from the surface of wet ground pellets. The time for treating the pellets to dry them was greatly reduced over previous drying techniques. Furthermore, all of the dust and grinding residue has been collected and saved, eliminating both contamination of the surroundings and further leading to a cost savings since the recovered pellet grindings can be recycled and reused.

I claim as my invention:

1. Apparatus for rapidly, efficiently and effectively removing surface fluids from a wetted cylindrical body, said apparatus comprising an elongated trough member having sides allowing movement of the cylindrical body along the trough member while lying on its side with the cylindrical walls of the body contacting the sides of the trough member, at least one aperture being formed in the sides of the trough member, with at least a portion of the aperture extending to the point where the cylindrical wall contacts that side of the trough member, evacuating means so connected to the trough member and the aperture as to draw in air from the inside of the trough member so that as the cylindrical body moves along the trough and past the aperture the air so drawn passes at a relatively high velocity over the surface of the cylindrical body and picks up excess fluid therefrom and carries it away through the aperture, and means for rotating the cylindrical body as it passes by the aperture, the speed of rotation being sufficient to cause substantially all the cylindrical surface to be exposed to the high velocity air stream, whereby substantially all the surface fluid is removed from the cylindrical body.

2. The apparatus of claim 1, wherein apertures are disposed in both sides of the trough member so that surface fluids are removed simultaneously by high velocity in air streams from at least two portions of the cylindrical body as it moves along the trough member.

3. The apparatus of claim 1, wherein the aperture is so shaped and oriented with respect to the cylindrical body that in combination with the high velocity air stream it comprises the means for rotating the cylindrical body.

4. The apparatus of claim 1, wherein vibratory means are associated with the trough member so as to cause the cylindrical body to move along the trough member to pass by the aperture.

5. The apparatus of claim 2 wherein the aperture in one side is so shaped and oriented with respect to the moving cylindrical body as to cause more air to flow therethrough and over the surface of the body as compared to air flow through the other aperture so as to result in a rotating force being applied to the cylindrical body.

6. The apparatus of claim 1, wherein the trough member comprises a channel member.

7. The apparatus of claim 2 wherein the trough member comprises a channel member with the apertures comprising slots in the side walls of the channel, the axis of the slots being near the line of contact of the cylindrical body to the side walls of channel.

8. The process for removing surface fluids from a wetted cylindrical body comprising passing the cylindrical body lying on its side down a trough having apertures adjacent the line of contact of the cylindrical body with the sides of the trough, drawing air at a high velocity past the cylindrical body and through the apertures and rotating the cylindrical body as it passes by the apertures whereby to remove substantially all the fluid from the surface of the cylindrical body.

9. The process for removing surface fluids and loose particles on the surface of a cylindrical nuclear fuel pellet, comprising the steps of passing the cylindrical pellet past an aperture through which a high velocity air stream is being drawn, rotating the pellet as it passes the aperture so that substantially all surfaces are exposed to the high velocity air stream whereby substantially all the surface fluid is removed and is carried away and all the loose surface particles are picked up and carried away by the air stream.

References Cited
UNITED STATES PATENTS

| | | | |
|---|---|---|---|
| 3,168,435 | 2/1965 | Beachler | 162—348 |
| 2,732,958 | 1/1956 | Bonanno | 214—38 |
| 1,328,897 | 1/1920 | Rice | 254—188 |
| 2,596,800 | 4/1952 | Webb | 34—21 |
| 3,096,162 | 7/1963 | Jepson | 34—33 |
| 3,429,744 | 2/1969 | McCormick | 134—7 |

MORRIS O. WOLK, Primary Examiner

D. LOVERCHECK, Assistant Examiner

U.S. Cl. X.R.

34—15, 34; 134—15, 32, 37, 133; 176—87; 198—60